United States Patent
Arana et al.

(10) Patent No.: US 9,201,672 B1
(45) Date of Patent: Dec. 1, 2015

(54) METHOD AND SYSTEM FOR AGGREGATION OF SEARCH RESULTS

(75) Inventors: John T. Arana, Carlsbad, CA (US); Michael A. Zinniger, Fallbrook, CA (US); Arie Trouw, Fallbrook, CA (US)

(73) Assignee: Revizer Technologies LTD, Tel-Aviv (IL)

( * ) Notice: Subject to any disclaimer, the term of this patent is extended or adjusted under 35 U.S.C. 154(b) by 0 days.

(21) Appl. No.: 12/960,340

(22) Filed: Dec. 3, 2010

Related U.S. Application Data

(63) Continuation-in-part of application No. 12/455,797, filed on Jun. 8, 2009.

(51) Int. Cl.
    *G06F 17/30* (2006.01)
    *G06F 7/00* (2006.01)
    *G06F 9/445* (2006.01)

(52) U.S. Cl.
    CPC ............................... *G06F 9/44526* (2013.01)

(58) Field of Classification Search
    CPC .................................................. G06F 9/44526
    USPC ........................................................ 707/706
    See application file for complete search history.

(56) References Cited

U.S. PATENT DOCUMENTS

| | | | |
|---|---|---|---|
| 5,310,349 A | 5/1994 | Daniels | |
| 5,826,025 A | 10/1998 | Gramlich | |
| 5,848,397 A | 12/1998 | Marsh et al. | |
| 5,903,728 A * | 5/1999 | Semenzato | 709/217 |
| 5,903,901 A | 5/1999 | Kawakura et al. | |
| 5,995,756 A | 11/1999 | Herrmann | |
| 6,297,819 B1 | 10/2001 | Furst | |
| 6,360,205 B1 | 3/2002 | Iyengar et al. | |
| 7,069,497 B1 | 6/2006 | Desai | |
| 7,096,426 B1 | 8/2006 | Lin-Hendel | |
| 7,271,815 B2 | 9/2007 | Clas | |
| 7,478,089 B2 | 1/2009 | Henkin et al. | |
| 7,493,614 B2 * | 2/2009 | Liu et al. | 717/175 |
| 7,529,744 B1 * | 5/2009 | Srivastava et al. | 1/1 |
| 7,533,144 B2 | 5/2009 | Kassab | |
| 7,584,435 B2 * | 9/2009 | Bailey et al. | 715/788 |

(Continued)

OTHER PUBLICATIONS

Nassim Laga et al, "A Unique Interface for Web and Telecom Services: From Feeds Aggregator to Services Aggregator", 6 pages.

(Continued)

*Primary Examiner* — Pavan Mamillapalli
(74) *Attorney, Agent, or Firm* — Vista IP Law Group, LLP

(57) ABSTRACT

Disclosed is an approach for providing an improved approach for searching and aggregation of searches on the internet, which allows more flexibility to perform and display search results, and also provides searching for a broad range of secondary search sites. A virtual layer is used to provide web page components to implement the searching and aggregation of search results, so that additional search results from secondary web sites can be aggregated with the search results from a primary web site. The aggregated results can then be displayed to the user at the primary search site. By using the virtual layer approach of embodiments of the present invention, this allows the aggregated search results to be placed on and overlaid with the web page from any desired search page. In addition, the searching can be specified for any secondary search sites, even sites which are not particularly with the same subject space as the primary site.

45 Claims, 11 Drawing Sheets

(56) References Cited

U.S. PATENT DOCUMENTS

| | | | |
|---|---|---|---|
| 7,698,685 B2* | 4/2010 | Pepin et al. ................ | 717/120 |
| 7,831,319 B2 | 11/2010 | Browne et al. | |
| 8,140,506 B2 | 3/2012 | Pennington | |
| 8,341,529 B1 | 12/2012 | Li et al. | |
| 8,667,415 B2 | 3/2014 | Rudolph et al. | |
| 2002/0010757 A1 | 1/2002 | Granik et al. | |
| 2002/0057299 A1 | 5/2002 | Oren et al. | |
| 2003/0014406 A1 | 1/2003 | Faieta | |
| 2003/0028451 A1 | 2/2003 | Ananian | |
| 2004/0019653 A1 | 1/2004 | Debaty et al. | |
| 2004/0111673 A1 | 6/2004 | Bowman | |
| 2004/0199603 A1 | 10/2004 | Tafla | |
| 2004/0201615 A1 | 10/2004 | Dietz | |
| 2005/0080676 A1 | 4/2005 | Lovegreen et al. | |
| 2005/0197893 A1 | 9/2005 | Landau et al. | |
| 2006/0026059 A1 | 2/2006 | Grosz | |
| 2006/0080592 A1 | 4/2006 | Alves de Moura | |
| 2006/0122917 A1 | 6/2006 | Lokuge | |
| 2006/0149618 A1 | 7/2006 | Balin et al. | |
| 2006/0155758 A1 | 7/2006 | Arnegaard | |
| 2006/0265476 A1 | 11/2006 | Barger | |
| 2006/0293959 A1 | 12/2006 | Hogan | |
| 2007/0038601 A1* | 2/2007 | Guha ................ | 707/3 |
| 2007/0044086 A1* | 2/2007 | Sampath ................ | 717/168 |
| 2007/0078705 A1 | 4/2007 | Abels et al. | |
| 2007/0113237 A1 | 5/2007 | Hickson | |
| 2007/0130090 A1 | 6/2007 | Staib et al. | |
| 2007/0146812 A1 | 6/2007 | Lawton | |
| 2007/0174915 A1 | 7/2007 | Gribble et al. | |
| 2007/0299938 A1 | 12/2007 | Chandra | |
| 2008/0005064 A1 | 1/2008 | Sarukkai | |
| 2008/0040425 A1 | 2/2008 | Hines | |
| 2008/0052160 A1 | 2/2008 | Forlai | |
| 2008/0104679 A1 | 5/2008 | Craig | |
| 2008/0120626 A1 | 5/2008 | Graffagnino | |
| 2008/0154731 A1 | 6/2008 | Mesaros | |
| 2008/0184158 A1 | 7/2008 | Selig | |
| 2008/0201304 A1* | 8/2008 | Sue ................ | 707/3 |
| 2008/0214150 A1 | 9/2008 | Ramer et al. | |
| 2008/0243785 A1* | 10/2008 | Stading ................ | 707/3 |
| 2008/0255967 A1 | 10/2008 | Shi | |
| 2008/0313215 A1 | 12/2008 | Beker et al. | |
| 2008/0319918 A1 | 12/2008 | Forlai | |
| 2009/0063351 A1 | 3/2009 | Schmeyer et al. | |
| 2009/0144264 A1* | 6/2009 | Singh et al. ................ | 707/5 |
| 2009/0235149 A1 | 9/2009 | Frohwein | |
| 2009/0265607 A1 | 10/2009 | Raz | |
| 2009/0276835 A1 | 11/2009 | Jackson et al. | |
| 2009/0300528 A1 | 12/2009 | Stambaugh | |
| 2009/0319636 A1 | 12/2009 | Tokumi | |
| 2010/0094755 A1 | 4/2010 | Kloster | |
| 2010/0107088 A1 | 4/2010 | Hunt et al. | |
| 2010/0114857 A1 | 5/2010 | Edwards et al. | |
| 2010/0235338 A1* | 9/2010 | Gabriel ................ | 707/706 |
| 2010/0281107 A1 | 11/2010 | Fallows et al. | |
| 2010/0313252 A1 | 12/2010 | Trouw | |
| 2010/0318426 A1 | 12/2010 | Grant et al. | |
| 2011/0035440 A1 | 2/2011 | Henkin et al. | |
| 2011/0071911 A1 | 3/2011 | Tung et al. | |
| 2011/0072035 A1 | 3/2011 | Gaucas et al. | |
| 2011/0173071 A1 | 7/2011 | Meyer et al. | |
| 2011/0178909 A1 | 7/2011 | Benefield et al. | |
| 2011/0202401 A1 | 8/2011 | Magadi et al. | |
| 2011/0225197 A1 | 9/2011 | Howes et al. | |
| 2011/0225232 A1 | 9/2011 | Casalaina et al. | |
| 2011/0238533 A1 | 9/2011 | Shadchnev et al. | |
| 2011/0307354 A1 | 12/2011 | Erman et al. | |
| 2012/0109732 A1 | 5/2012 | Jaffe | |

OTHER PUBLICATIONS

Abdul Rahim et al., "Fuzzy Inferencing in the Web Page Layout Design", Proceedings of the 1st International Workshop on Web Services: Modeling, Architecture and infrastructure, Apr. 2003, pp. 33-41, Portugal.

Andrew Yang et al., "Developing Integrated Web and Database Applications Using JAVA Applets and JDBC Drivers", SIGSCE, 1998, pp. 302-306, Atlanta, GA, USA.

Laurent Denoue et al., "An Annotation Tool for Web Browsers and Its Applications to Information Retrieval", 16 pages.

Corin R. Anderson et al., "Web Montage: A Dynamic Personalized Start Page", ACM, May 2002, 9 pages, Honolulu, Hawaii, USA.

Krishna Bharat et al., "Personalized, Interactive News on the Web", Personliaxed, Interactive News on the Web, May 5, 1997, 22 pages.

Weisong Shi et al., "Workload Characterization of a Personalized Web Site—And Its Implications for Dynamic Content Caching", Technical Report, 17 pages.

Muriel Bowie, "Adaptation of a Webshop for Mobile Devices", A thesis submitted in partial satisfaction of the requirements for the degree of Master of Science, Oct. 2005, 85 pages, University of Fribourg, Switzerland.

Xing Xie et al., "An adaptive web page layout structure for small devices", Multimedia Systems, Oct. 14, 2005, pp. 34-44, Springer-Verlag.

Yontoo Launches New Layer Apps Technology, New Web Application Allows Users to Modify Existing Web Pages, Yontoo Technology, Inc. 2008.

Yontoo Adds Layouts to Facebook with Release of PageRage Super Profile Application, Social Media Portal, Sep. 30, 2008, Yontoo Technology, Inc.

Zoltan Fiala et al., "A Generic Transcoding Tool for Making Web Applications Adaptive", Proceedings of the CAiSE'05 Forum, 2005, pp. 15-20, Portugal.

Masahiro Hori et al., "Annotation-Based Web Content Transcoding", 23 pages.

Florian Daniel et al., "Understanding UI Integration: A Survey of Problems, Technologies, and Opportunities", 10 pages.

Vicki L. Hansen et al., "Browser Augmentation", 19 pages.

Carmel Domshlak et al., "Preference-Based Configuration of Web Page Content", 6 pages.

Non-Final Office Action for U.S. Appl. No. 12/455,797 Mailed on Mar. 30, 2011.

Final Office Action for U.S. Appl. No. 12/455,797 Mailed on Jan. 3, 2012.

Non-Final Office Action dated Feb. 15, 2013 for U.S. Appl. No. 13/333,855.

Final Office Action dated Jul. 18, 2013 for U.S. Appl. No. 13/333,855.

Non-Final Office Action dated Dec. 4, 2012 for U.S. Appl. No. 13/109,879.

Final Office Action dated Jun. 11, 2013 for U.S. Appl. No. 13/109,879.

Non-Final Office Action dated Feb. 28, 2014 for U.S. Appl. No. 12/960,322.

Non-Final Office Action dated Jul. 17, 2014 for U.S. Appl. No. 13/333,855.

Final Office Action dated Sep. 11, 2014 for U.S. Appl. No. 12/960,322.

Non-Final Office Action dated Aug. 8, 2014 for U.S. Appin. No. 13/282,417.

Non-Final Office Action dated Oct. 22, 2014 in U.S. Appl. No. 13/284,771.

EURO investor article "Facebook Users Can Now Create Personalized Backgrounds with PageRage.com" dated Jul. 28, 2009 retrieved from [http://www.euroinvestor.fr] on [Jul. 31, 2014].

Jackson et al. Subspace: Secure CrossDomain Communication for Web Mashups. WWW 2007, May 8-12, Banff, Alberta, Canada. Retrieved from [http://ants.iis.sinica.edu.tw/3bkmj9ltewxtsrrvnoknfdxrm3zfwrr/84/Subspace.pdf] on [May 7, 2013].

PageRage beta.http://www.pagerage.com. Yontoo Technology Inc © 2008, available to the public Aug. 5, 2008 [retrieved from Internet Archive on Jul. 31, 2014].

Non-Final Office Action dated Jun. 18, 2014 for U.S. Appl. No. 12/960,359.

"Page Rage for Facebook." Blog entry posted Sep. 30, 2008. Retrieved from [https://starbucksgirl.wordpress.com] on [Nov. 25, 2014].

(56) References Cited

OTHER PUBLICATIONS

"Yontoo Adds Layouts to Facebook with Release of Page Rage Super Profile Application." Reuters. Sep. 29, 2008. Retrieved from [http://reuters.com] on [Nov. 21, 2014].

Alman, Ben. "jQuerypostMessage: Crossdomain scripting goodness" version 0.5, last updated Sep. 11, 2009, retrieved from [http://benalman.com/projects/jquerypostmessage-plugin] on [Nov. 26, 2014].

Couvreur, Julien. "Cross-document messaging hack." Blog entry posted Sep. 18, 2006. Retrieved from Internet Archive on [Nov. 25, 2014].

Final Office Action dated Mar. 26, 2015 for U.S. Appl. No. 13/284,712.

Non-Final Office Action dated Sep. 10, 2014 for U.S. Appl. No. 13/284,712.

Final Office Action dated Jan. 14, 2015 for U.S. Appl. No. 13/282,417.

Final Office Action dated Nov. 6, 2014 for U.S. Appl. No. 12/960,359.

Non-Final Office Action dated Jan. 28, 2015 for U.S. Appl. No. 13/109,879.

Dutta, Sunava. "An Introduction to Cross-Document Messaging in Internet Explorer 8" Blog entry posted May 2008, accessible at [http://msdn.microsoft.com] on [Dec. 25, 2010] retrieved via Internet Archive on Nov. 25, 2014.

eHow. "How to Find Facebook Layouts." Entry posted at eHow by plasticostrich available Jun. 11, 2009 retrieved via Internet Archive from [http://www.ehow.com/how.5013535.facebook-layouts.html] on [Nov. 25, 2014].

Lecomte, Julien. "Introducing CrossFrame, a Safe Communication Mechanism Across Documents and Across Domains" Blog entry posted Nov. 26, 2007. Retrieved from [http://julienlecomte.net] via Internet Archive on [Nov. 25, 2014].

Mahemoff, Michael. "Cross-Domain Communication with I Frames." Blog entry posted Mar. 31, 2008. Retrieved from [http://softwareas.com] via Internet Archive on [Nov. 25, 2014].

Final Office Action dated Sep. 2, 2015 for U.S. Appl. No. 13/109,879.

Non-Final Office Action dated Sep. 10, 2015 for U.S. Appl. No. 13/282,417.

* cited by examiner

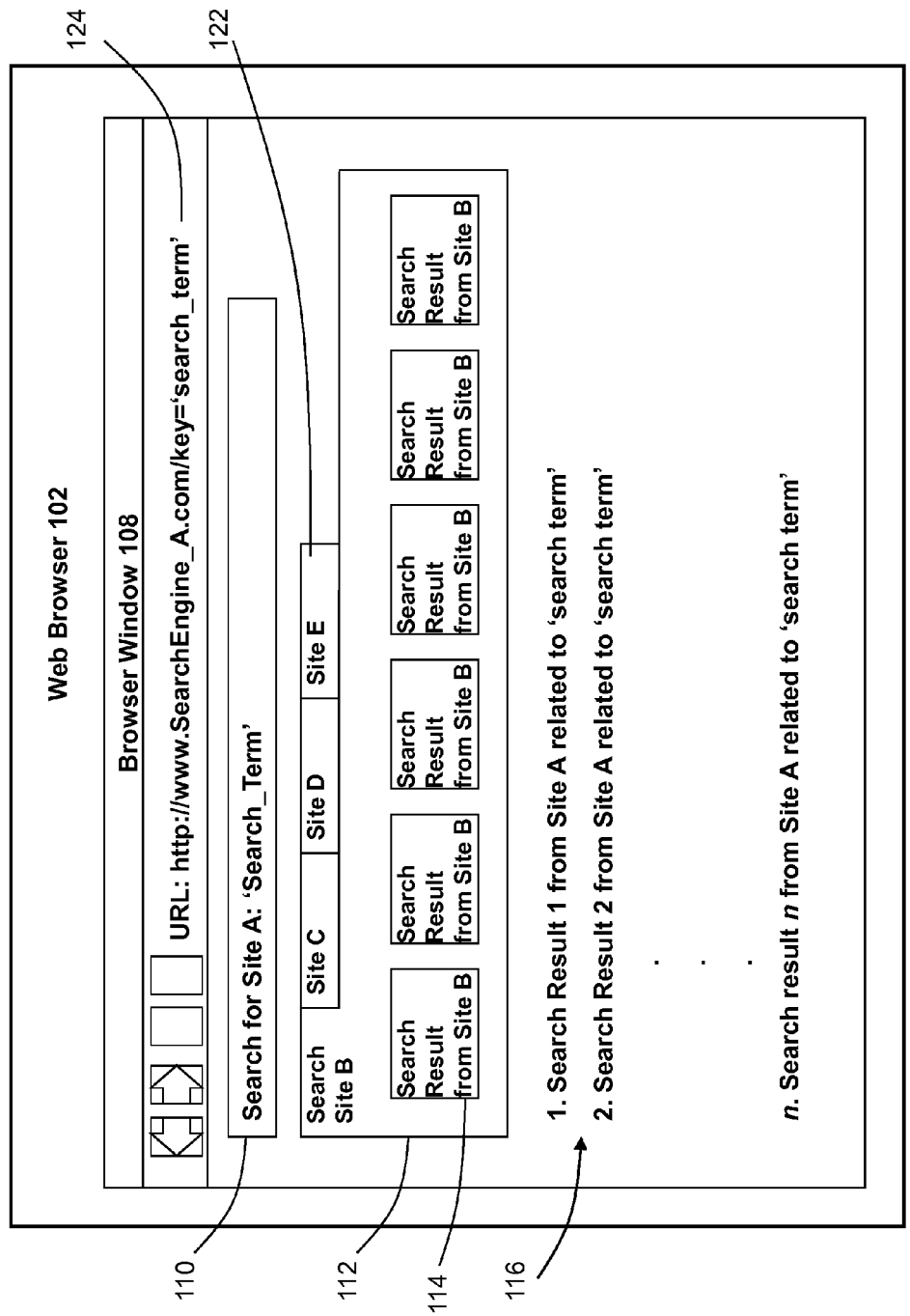

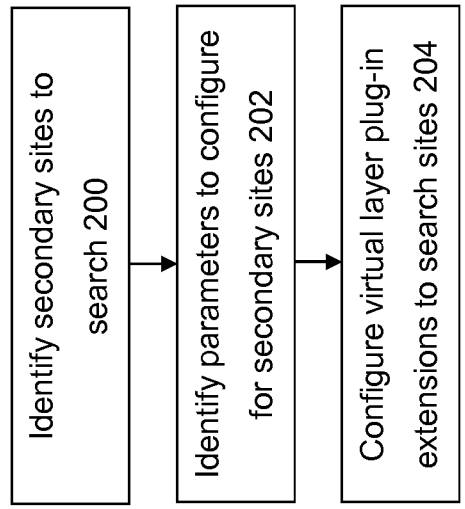

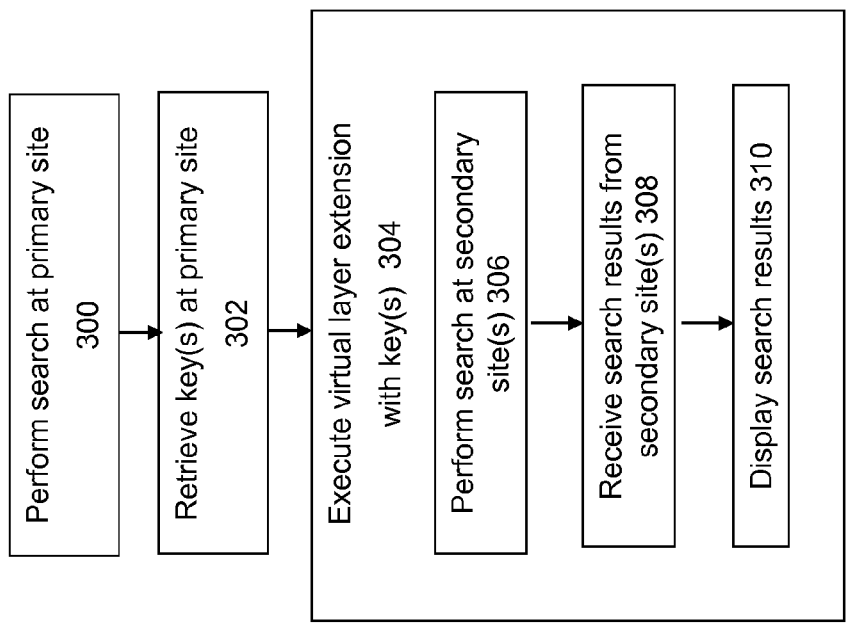

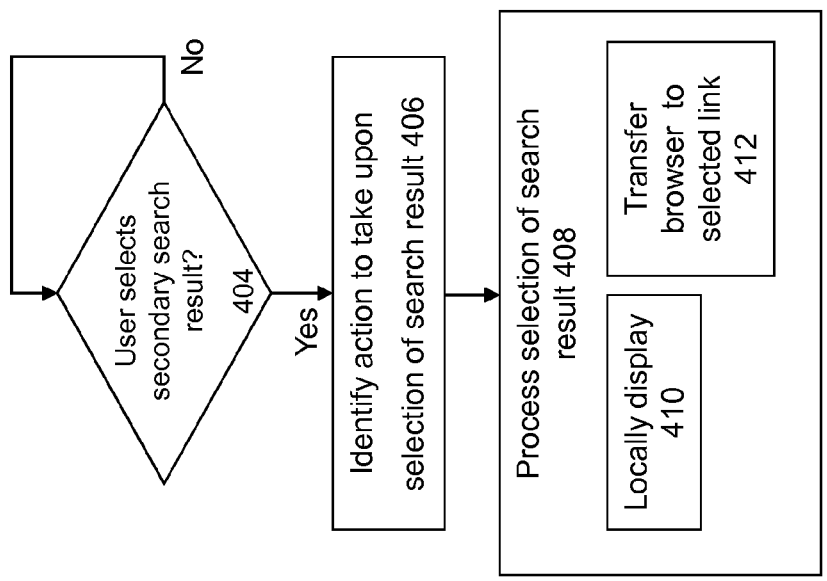

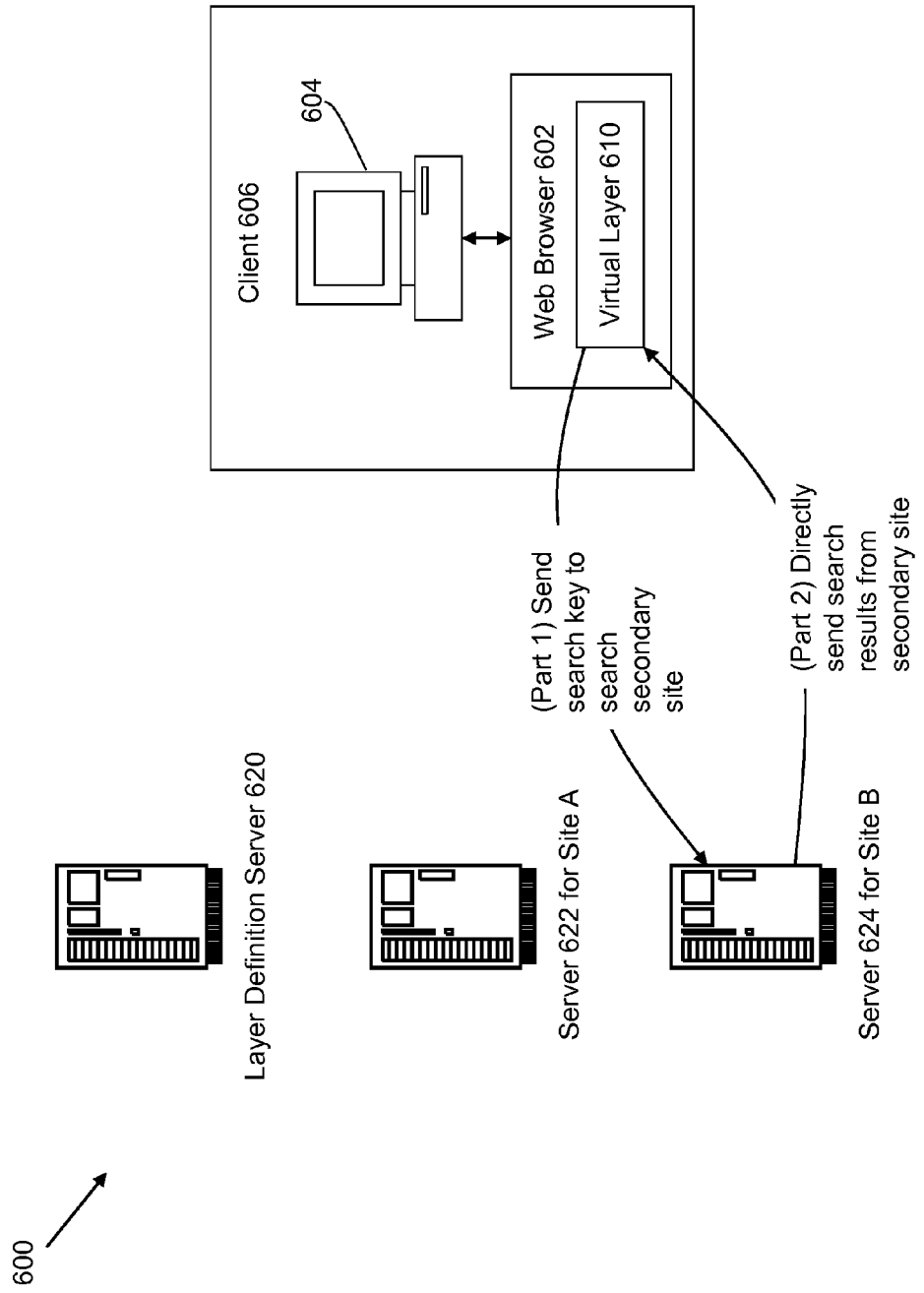

US 9,201,672 B1

METHOD AND SYSTEM FOR AGGREGATION OF SEARCH RESULTS

CROSS-REFERENCE TO RELATED APPLICATIONS

This application is a continuation-in-part of U.S. patent application Ser. No. 12/455,797, filed on Jun. 8, 2009, which is hereby incorporated by reference in its entirety.

FIELD

The present invention generally relates to a technique to enable automated searching and aggregation of search results on the World Wide Web.

BACKGROUND

Typically, users interact with the internet through World Wide Web (WWW) servers and World Wide Web (WWW) pages which offer hypertext capabilities. Hyper Text Markup Language (HTML) is a scripting or programming language which enables the content providers or developers of World Wide Web pages to place hyperlinks within World Wide Web pages which then link to related content or data present in other World Wide Web pages. The content or data present in each web page can be navigated by the end users of World Wide Web using a Graphical User Interface (GUI).

A common task performed by users on the internet is to perform a search function. There are many generalized search engine sites that allow users to perform searches for a large range of topics that may be indexed by those search sites. Examples of generalized search engine sites include Google and Yahoo.

In addition, more specialized internet sites also allow searching to be performed on those sites to allow users to identify content that may be of specific interest to those users. For example, www.youtube.com is an example of a specialized video hosting site that allows users to search the site for videos of interest. Another example of a specialized internet site is www.ebay.com, which is an auction/shopping site that allows users to search the site for products of interest. Yet another example of a specialized site is www.facebook.com, which is a social networking site that allows users to search the site for people, messages, or other social content of interest.

It is often desirable to allow a user to search multiple internet sources at the same time, and to provide an aggregated view of the results to the user. For example, many travel sites allow a user to search for airline tickets or hotel availability from multiple sources/companies, and to display the aggregated results of the search from the different airline companies or hotel chains to the user on an aggregated display.

However, the existing approaches for performing aggregated searches often provide sub-optimal results for the user. One reason is because the searching must occur at a specific internet site that performs such activities, e.g., at the travel web site, the aggregated searching functionality must be supported by that host site, and the results must be presented at that same site. In addition, the specialized site only performs searches for a narrow range of sources that are directly related to the topic specialization of that site, e.g., a travel site only searches underlying sources relating to travel-related topics such as airline tickets and hotel room reservations. The specialized aggregation sites cannot (and are not intended to) provide aggregation of search results from more generalized or different sources.

Therefore, there is a need for an improved approach to allow searching and aggregation of searches on the internet, which allows more flexibility to perform and display search results, and also provides searching for a broad range of secondary search sites.

SUMMARY

According to some embodiments of the invention, disclosed is an improved approach for implementing searching and aggregation of searches on the internet, which allows more flexibility to perform and display search results, and also provides searching for a broad range of secondary search sites. A virtual layer is used to provide web page components to implement the searching and aggregation of search results, so that additional search results from secondary web sites can be aggregated with the search results from a primary web site. The aggregated results can then be displayed to the user at the primary search site. By using the virtual layer approach of embodiments of the present invention, this allows the aggregated search results to be placed on and overlaid with the web page from any desired search page. In addition, the searching can be specified for any secondary search sites, even sites which are not particularly with the same subject space as the primary site.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 1 illustrates an example interface for presenting aggregated search results according to an embodiment of the invention.

FIGS. 2A and 2B illustrate high-level flowcharts of an approach for implementing search aggregation with virtual layers according to an embodiment of the invention.

FIG. 3 illustrates a flowchart of an approach for searching a secondary search site according to an embodiment of the invention.

FIG. 4 illustrates a flowchart of an approach for handling selection of a search result from a secondary search site according to an embodiment of the invention.

FIGS. 6A-D provide an illustrative example of an embodiment of the invention.

DETAILED DESCRIPTION

Figure 2B:
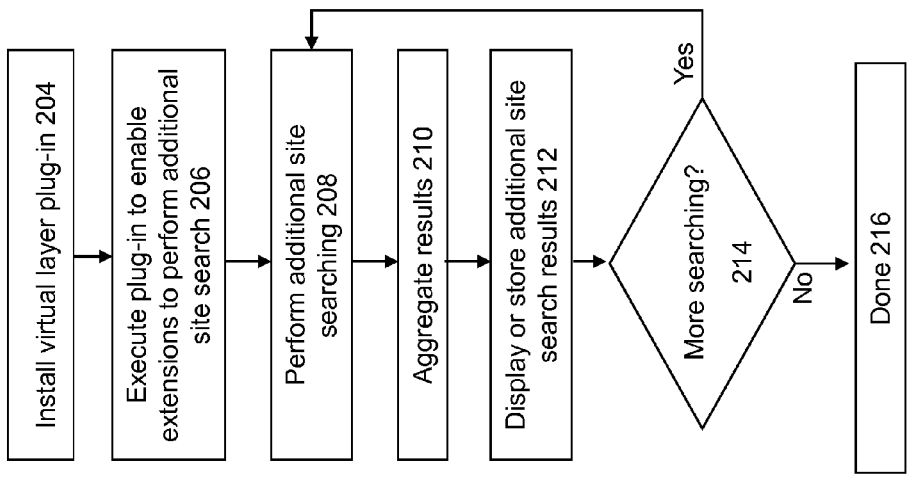

The present invention is directed to an improved approach for searching and aggregation of searches on the internet, which allows more flexibility to perform and display search results, and also provides searching for a broad range of secondary search sites. A "virtual layer" is used to provide web page components to implement the searching and aggregation of search results, so that search aggregation can be performed for any site, including sites that do not natively provide this functionality.

As used herein, the terms "searching" or "search" can refer to any suitable kind of data identification or acquisition, and can be performed from any suitably selected site. For example, a search in the context of this invention can refer to the traditional internet search in which a search term is provided to a web site, and the search feature of the web site uses that term to perform a content-based search of the web site. In the context of certain embodiments of the invention, a search can also refer to the process of performing data identification without performing a search using search terms or keywords. For example, consider a web site that does not natively include a feature to perform keyword searching for that site. Nevertheless, data identification can still occur for that site, e.g., by scraping or extracting content from the site, and using contextual analysis or word counts to identify subject matter of interest from a web page. Therefore, as used herein, the term "search" should not be limited in its scope to keyword based searches unless expressly stated as such.

The search terms or other types of data identification keys for the primary search site can be sent to any number of secondary search sites to perform a search. As discussed above, such a search at the secondary sites may refer to keyword-based searching, or may refer to other kinds of data identification (such as contextual analysis or word counts). The aggregated results can then be displayed to the user at the primary search site.

The embodiments of the invention may be applied to search any type of primary or secondary search site. For example, the invention may be applied to search web sites that include traditional keyword-based search features. The invention may also be applied to other types of data content from which data identification and data acquisition may occur. For example, the invention may be applied to retrieve search results from "sites" such as RSS (Really Simple Syndication) feeds, blogs, tweets, text messages, databases, and the like. Therefore, as used herein, the term "search site" is meant to encompass any type of data content from which data identification and data acquisition may occur.

For the purposes of illustration, embodiments of the invention will be described below in the context of keyword-based searches that are performed against search sites which are web sites that include keyword-based search functionality. It is noted, however, that the inventive concepts explained herein are not limited in this manner unless specifically claimed as such.

FIG. 1 shows an illustration of an example interface for searching and aggregating search results according to some embodiments of the invention. The interface is generated by a client computer that is executing a web browser 102 to display a web page in a browser window 108. It is assumed that the browser window 108 is currently displaying the web page for a primary search site "A", and that the user has provided a search term ("Search_term") to be searched at the primary site A. The search term is often inputted by the user and/or displayed in a separate search area/box 110 within the browser window 108. As is typical of most search engine sites, a list of search results 116 is presented to the user based upon the search term provided by the user in the search area 110.

The novelty presented by embodiments of the present invention is that an additional interface area 112 within browser window 108 is provided to display search results 114 from additional secondary search sites. This interface area 112 to perform searching aggregation may be provided whether or not the host web site natively provides functionality to perform search aggregation. The interface area 112 is overlaid onto the web page from the primary search site A so that the additional search results 114 from the secondary search sites B, C, D, and E can be aggregated with, and displayed alongside, the search results 116 from the primary search site. As described in more detail below, virtual layer software is used to allow third party content (e.g., the additional interface area 112 displaying the search results from secondary search sites) to be displayed in conjunction with the host web page from the primary search site.

The advantage of this approach is that the virtual layer (embodied as the display area 112 with the additional search results) can be displayed and overlaid onto the web page for any primary search site. This is in sharp contrast to conventional approaches that require the user to actually visit a specialized aggregation web site (such as a specialized travel consolidation site like Expedia or Travelocity) in order to perform searches of multiple sources and to view aggregated search results. Therefore, embodiments of the invention can be suitably applied to any web site to perform and display aggregated searches of multiple sites. Even for such a specialized search site, the invention can be applied to aggregate search results on that site with search results from any other sites, including sites that do not share the same specialization as the host site.

To allow such aggregated search results to be displayed onto a primary web site according to some embodiments of the invention, a virtual layer plug-in is installed within web browser 102 to permit third party content to be displayed onto a primary site web page. The virtual layer plug-in is an application running on the client device that enables virtual editing of the appearance or functionality of an existing World Wide Web page by making the modifications on a virtual layer that is superimposed onto the web page. The virtual layer essentially allows a foreign entity or a user to include or enhance content that is utilized or displayed onto a web page, even if the web page itself does not natively provide such functionality to allow a third party to add or enhance content on the web page.

As described in more detail below, the virtual layer plug-in can be used to instantiate "extensions" onto the web page, including any scripts or other programs that may need to be executed on the web page to allow searching of secondary sites and display of additional search results within the browser window 108. For example, the virtual layer plug-in may be used to instantiate a javascript program to identify search terms on the primary search site A and to send the search term for searching at secondary sites B, C, D, etc. The virtual layer plug-in may also be used to instantiate a Flash-based program to display image or video based search results from the secondary sites.

To illustrate, assume that the primary site is a generalized search engine such as Google. The user may enter a search term into the Google search box 110 and receive conventional Google search results at 116 in browser window 108. In addition, the user may have selected additional secondary search sites for interface area 112, such as selecting a video hosting site like www.Youtube.com as search site B, a shopping site such as www.ebay.com as search site C, and a social networking site such as www.facebook as search site D. The virtual layer extension will identify the search term used at the primary site A (i.e., Google) and will send that search term to the secondary sites for searching. The additional search results 114 will be displayed within display area 112. The display area 112 includes interface tools, such as tabs 122, to allow the user to switch between the search results from the different secondary sites. The display area 112 may be implemented to display search results from the secondary sites in any suitable display format or display type, e.g., to display videos from a video hosting site, thumbnail pictures from a shopping site, or textual messages, pictures, etc. from social networking sites.

This example highlights another advantage of embodiments of the invention, in which the aggregated searching of the invention can be performed against any configurable set of search sites, even if the secondary sites have different areas of subject matter emphasis. This is in contrast to conventional approaches that only allow aggregated searching for a narrow group of underlying sources that share a common focus or emphasis, such as specialized travel consolidation sites like Expedia or Travelocity that can only perform aggregated searches against specialized travel-based sources.

FIG. 2A shows a high-level flowchart of an approach to configure a virtual layer server for implementing aggregated searching according to some embodiments of the invention. The virtual layer server essentially provides the initial configurations for the virtual layer plug-in that allows the aggregated searching to be performed at the client. The virtual layer server builds a list of the extensions to be installed by the virtual layer plug-in in order to facilitate the aggregated searching, so that when the extensions are installed and run at the client, the virtual layer is superimposed onto web sites within the client's web browser, where the virtual layer include "extensions" that provide additional functionality or content to the built-in capabilities of a given web page.

The configuration for the extensions to perform aggregated searching begins at 200 with an identification of sites that may need to be searched with the virtual layer extension. In some embodiments, such sites may include any suitable web site for which searching may be performed and/or desired by a user. Any form of data identification may be employed. In many cases, the search site has an exposed interface or API to allow third parties to perform searches on that site. For example, many of the common user/consumer-accessed web sites such as Youtube, eBay, Facebook, and Yelp have exposed APIs that allow third parties to perform searches on those sites. In other cases, contextual analysis may need to be performed to identify relevant data items or subject matter on a site. For example, word counts may be performed, and matched against an analysis engine (e.g., to discard non-significant terms such as "the", "a", or "and") to identify specific content or subject matter from the site of interest. As another example, certain HTML tags could be used to identify the terms or content of interest within a web page, e.g., by identifying words associated with HTML "H1" tags.

Next, at 202, an identification is made of the parameters and settings for the virtual layer software that need to be configured to perform searches on the identified web sites. For example, the different search sites may have different search protocols, API commands and syntaxes, as well a different search result formats and schemas that need to be handled by the virtual layer plug-in. Therefore, the specific configuration changes that need to be implemented for the different web sites are identified at 202. This action is described in more detail below in conjunction with the description of FIG. 5.

Thereafter, at 204, the virtual layer plug-in extension is configured and/or modified as appropriate to implement the ability to address the identified web sites. The virtual layer software is made available to be downloaded by users to the client computers to allow the aggregated searching of the invention.

One approach for implementing the virtual layer is by using an enhanced XML schema (referred to herein as YLML or "Yontoo Layer Markup Language"), which contains executable programming tags, referenceable data tags, renderable UI tags and the like. Unlike HTML, which is a document markup language that is sometimes used as an application markup language simply because it is widely supported and the industry norm, YLML is a true application markup language that is different from HTML in that it has executable nodes and does not follow the same DOM structure that HTML does. YLML is also different from other XML languages in that it does not use code-behind. YLML does not require a separate file with logic source code, nor does it have imbedded logic using external languages. While other dynamic versions of XML require the use of code-behind or require the addition of external languages such as JavaScript and VBScript to be imbedded into script tags, YLML has native executable logic tags that eliminate the requirement for other languages to be imbedded into tags or used for code-behind.

An object model that works in conjunction with YLML is also employed, which is referred to herein as a YOM or Yontoo Object Model. A DOM can use only the information that exists in the document it is referencing to create a set of objects that are used to access the data within the HTML. The YOM on the other hand, is a single template that has an established structure that enables access to any information, data or content accessible through a computer system, including, but not restricted to the World Wide Web, databases, data stores, a client's computer or other content sources. This implies that unlike a DOM, which only creates objects for tags for content that exists in whole within the HTML document that it references, the YOM's established structure enables it to access specific content that exists on the World Wide Web, a database, a data store or any other location connected to a networked computer system without requiring content beyond the scope of exactly what is needed to be loaded. This enables the YOM to create objects within the model using a JIT (just in time) method, as opposed to creating the entirety of the model when the incoming file is parsed as is the case with the use of a DOM. One advantage of using the YOM over the DOM is that it gives access to a much broader range of content, including the World Wide Web, databases, data stores, a client's computer or other sources of content, according to an example of the present invention. For a DOM to provide this access, it would need to first load the entirety of the content that exists within these sources which is performance prohibitive.

The extensions for performing aggregated searching are implemented using a combination of the YLML, the YOM and the virtual layer system to additional content and functionality to an existing web page. The extensions may be implemented using any suitable programming and/or scripting language. For example, in some embodiments, the searching functionality for aggregated searching may be implemented with Javascript and a Flash-based approach maybe utilized to display the search results from secondary search sites. According to some embodiments, the method for configuring a virtual layer includes aggregating objects corresponding to the plurality of layer extensions and corresponding to the URL using a layer markup language. The step of aggregating the objects is executed through a layer definition server unit adaptable to the layer markup language may also include a plurality of built-in logical tags for avoiding a need of writing scripts for enabling objects for executing events. The method for configuring an editable virtual layer in an internet browsing environment further includes loading a prerendered layer markup language module, returning the layer markup language to the virtual layer software sub-unit including a plurality of layer extensions present on the URL and having the virtual layer software sub-unit executing initialization routines in the layer markup language.

The rendering functionality within the virtual layer plug-in recognizes that it needs to add the secondary search results window to the host web page, which is implemented in some embodiments by using Javascript to augment the DOM/YOM of the existing host web page. The correct location on the host web page is identified using the markup language items (XML or YLML) that was downloaded as part of the extension data, and used to inject the Javascript/Flash player at the appropriate location on the host web page.

The layer definition server may maintain a mapping structure to track the specific extensions to load for a given user and/or application. For example, the user may be associated with different applications that use the virtual layer plug-in, and the mappings identify which specific application extensions should be injected for that specific user. When appropriate identified, the extensions would be installed onto the virtual layer of the web page for the user.

Further details regarding an exemplary approach for implementing extension lists, virtual layer plug-ins, and virtual layers are described in co-pending U.S. Ser. No. 12/455,797, entitled "SYSTEM, METHOD AND APPARATUS FOR CREATING AND USING A VIRTUAL LAYER WITHIN A WEB BROWSING ENVIRONMENT", filed on Jun. 8, 2009, which is hereby incorporated by reference in its entirety.

FIG. 2B shows a flowchart of the high-level steps at the client computer for implementing aggregated searching according to some embodiments of the invention. At 204, the user installs the virtual layer plug-in at the client computer. The virtual layer plug-in is used to communicate with the layer definition server to transfer web content pertaining to the virtual layer, and to render the transferred web content on the client computing system. The application object model includes a document object model unit for posting to the plug-in information, indexes and references pertaining to downloaded object in the client computing system further pertaining to markup languages.

At 206, the virtual layer plug-in is executed to install the identified extensions to perform aggregated searching. According to some embodiments, the extensions to install comprise a Javascript program to perform the functionality of initiating search requests to secondary search sites, and to process search results from the secondary search sites. In addition, the extensions may comprise a display program, e.g., a Flash-based program, to display the search results from the secondary search sites.

Once the extensions have been installed, then at 208, the web browser at the client machine can perform searching of the secondary search sites based on the search conducted at the primary site. In some embodiments, this occurs when a search is performed at a primary search site that is configured to operate with the present invention. In this situation, the search terms used at the primary search site can be identified, and is sent to the secondary sites for additional searching.

At 210, the search results from the secondary search sites are received at the client computer, and are aggregated for display to the user. Additional processing may be performed to facilitate aggregation of the search results. For example, the search results may be formatted to facilitate display of the search results. Thereafter, at 212, the aggregated search results are displayed to the user and/or stored on a computer readable medium. According to a current embodiment, the search results are displayed onto a virtual layer that is overlaid on the web page for the primary search site. An example of a suitable display format is shown in FIG. 1, in which the search results 114 from the secondary search sites are displayed within an interface window 112 that includes interface controls (such as tabs 122) to allow the user to switch between the search results from the different secondary search sites.

A determination is made at 214 whether additional searching is desired or needed. For example, the original search results could have resulted in identification of additional terms, content, or sites that should be searched. The user may also specify the need to perform additional searches, e.g., using interface controls within the web page. If so, then the process returns back to 208 to perform additional searching.

FIG. 3 shows a more detailed flowchart of the actions of the virtual layer plug-in/extensions to perform aggregated searching according to some embodiments of the invention.

At 300, the user starts by performing a search at a primary search site. As noted above, the "search" can refer to any suitable kind of data identification or acquisition, and can be performed from any suitably selected site. For example, the search can be implemented by providing a search term is provided to a search-enabled web site, and the search feature of the web site uses that term to perform a content-based search of the web site. The search can also refer to the process of performing data identification without performing a search using search terms or keywords, e.g., by scraping or extracting content from the site, and using contextual analysis or word counts to identify subject matter of interest from a web page. The primary search site can be any type of data content from which data identification and data acquisition may occur. For example, the invention may be applied to retrieve search results from web sites, RSS feeds, blogs, tweets, text messages, databases, and the like.

At 302, the search key for the search at the primary search site in retrieved. For many search sites, the search key corresponds to the keyword(s) that are used to perform a keyword based search of a web site. However, the search key can be any significant term or content that correspond to the search/data identification at 300, e.g., from performing a contextual review or word counts/analysis of the primary search site.

According to some embodiments, the search key is identified from the URL of the search results page for the primary search site. Many web sites and search engines that perform keyword searches will insert the search key into the URL of the search result page. The URL will often include some sort of tag (such as "Q" or "P") that identifies the search key associated with the search performed by the search engine of the web page. For these types of systems, the URL is analyzed to identify the search key. For web sites that do not insert the search key into the URL, the search box 110 within the web page itself can be analyzed to identify search key.

The software for the virtual layer extension to perform the aggregation searching is performed, at 304, using the search key identified from 302. At 306, the search request is sent to the secondary search sites. It is noted that the secondary search sites may be any site from which additional searching can occur to suitably identify additional results that can be aggregated with search results from the primary search site. Therefore, like the primary search site, the secondary search site can be any type of data content from which data identification and data acquisition may occur, e.g., web sites, RSS feeds, blogs, tweets, text messages, databases, and the like. In addition, the secondary search site can actually be the exact same site as the primary search site, where the additional searching is performed based on a different set of keys, context, criteria, or display from the original search on the primary search site.

According to some embodiments, the search requests to the secondary search sites are implemented by issuing the appropriate function calls in the specific API formats required by the secondary search sites. The API is used to provide the search key to a search-enabled web site, and the search feature of the web site uses that term to perform a content-based search of the web site. The search request can also be made using other approaches to perform data identification at the secondary search sites, e.g., by scraping or extracting content from the secondary search sites, and using contextual analysis or word counts to identify subject matter of interest from a web page.

The search requests may undergo additional modifications or processing prior to be sent to the secondary search sites. For example, certain web sites (such as Yelp) utilize localization data to confine the scope of a search. According to some embodiments, the IP address of the client machine may be used to identify the location of the user, so that the user location is sent as part of the search request to secondary search site to provide a location-specific search. The user location may also be manually specified by the user, to override or change the location generated from the IP address.

Another example of a type of modification for the search may be based on user personalization. It is possible that certain search terms have multiple meanings, and it may be desirable to process the search request and/or search results so as to be more closely aligned or "personalized" to the expected desires of the user. For example, consider the search term "Mercury", which may refer either to a chemical element or to a car brand. A car enthusiast may desire the search to be weighted such that results from a search using this term is focused on searches in the automotive subject area. On the other hand, a chemist or environmentalist may desire the search to be weighted such that the results from a search are focused on this term being used in its chemical context.

At 308, the search results are received from the secondary search sites and are processed for display. It is likely that the different secondary search sites will return search results in a variety of different formats and schemas. In some embodiments, the search results are provided as raw data in XML using a schema that is specific to that particular web site. Therefore, the search result in the XML will be formatted or arranged as appropriate to be displayed within the interface to be overlaid onto the primary web page.

At 310, the aggregated search results are displayed to the user. The search results may be arranged in any suitable way for display to the user. One approach is to arrange the search results mimic the display format of the secondary search site. For example, web sites such as Facebook, Youtube, Yelp, and eBay have particular arrangements of colors, text, and images for searching results. The display of the search results can be arranged so that the results from a given secondary search site will include the look and feel of that search site, even though it is being displayed in results window that is overlaid onto another web site. For instance, the search results from a secondary search to eBay may include a thumbnail image of a for-sale object, along with its current price and description in a display format that closely matches the typical search result as if the user is performing a primary search on eBay. The search results may also be displayed in a manner that differs from the original search result format of the source web site, e.g., to allow arrangements of the display data to better fit the smaller footprint of the virtual layer display window 112 at the host web page.

According to some embodiments, the display program is a Flash-based program that is implemented using Adobe/Macromedia Flash programming. Flash programs is a type of program that allows media types (such as video, animation, pictures, user interaction, and text) to be displayed onto a web page. In addition, display programs from the secondary search sites may be inserted into the browser to display the search results. For example, Youtube provides a portable video player application that me be embedded into the display window 112 to display Youtube videos.

According to some embodiments, the user may select which secondary search site is to be search and/or displayed on the virtual layer. An interface may be provided which includes a list of the supported secondary search sites. The selected secondary search sites would be process as described above and displayed in the interface area 112 shown in FIG. 1.

FIG. 4 shows a flowchart of an approach for handling user interaction with the secondary search results. In some embodiments, the search results 114 presented in the interface window 112 of FIG. 1 merely provides a shorthand summary view of the full results from the secondary search sites. Any of the search results 114 may be selected by the user to present a much fuller view of the search results to the user. For example, the shorthand search result 114 in the interface window 112 may only present a low resolution thumbnail image of a picture, and/or with text that is a summary or subset of the original full text. To expand the view of the shorthand result, e.g., to expand the thumbnail picture as a high resolution image, the user would select that search result to see the full results of the search.

The reason for the technique shown in FIG. 4 is that the search results from different web sites may need to be handled differently from one another. In some situations, the shorthand results can be appropriately expanded within that local interface window 112 in the web browser 108, e.g., to allow a video from Youtube to be played in locally-based video player within interface window 112. In other situations, it makes sense to allow user selection of a shorthand search result to be handled differently, e.g., by re-directly the user browser to the original web site to expand upon the shorthand search result. For example, the interface window 112 may present shorthand search results from a secondary eBay search, which only presents a summary of an item that is for sale. Selection of a shorthand search result from a secondary eBay search may be handled by redirecting the browser (e.g., opening a new tab, opening a new window window, or changing the current link) to the full web page at eBay for the for-sale item corresponding to the shorthand display in the virtual layer, which would allow the user to use the native eBay web page interface to make a purchase bid for the item.

Therefore, as shown in FIG. 4, a determination is made at 404 whether the user has made a selection of an item within the secondary search results in interface window 112. This selection by the user can be implementing by using a mouse interface to move the cursor over a specific result 114 in the interface 112, and using a mouse button to indicate selection of the specific item.

At 406, identification is made of the action(s) that need to be taken for the selected item. For example, for certain items, selection will result in identification of the link to the original search result and an indication that the selection will cause redirection of the browser to that link. This link information can be in the form, for example, of the URL to the search result. For other items, the item corresponds to a specific action that can be taken with browser redirection. For example, the item may be associated with the action to open the full item in a local media player.

In some embodiment, the configuration phase for the virtual layer extension has already established the specific handling approach that needs to be taken for user selection of specific items and/or items from certain web sites. For example, the extension can be programmed to recognize that selection of a specific result from a secondary eBay search is handled a certain way (e.g., by redirecting the web browser to a native eBay page for the selected item), whereas selection of a specific video from a secondary Youtube search is handled differently (e.g., by locally displaying the view in a local video player). Therefore, the actions can be pre-configured by the developer of the virtual layer extension based on known characteristics of the secondary search sites.

In other embodiments, the user can specify the handling of selection of a search result. For example, for a video identified from a secondary search of the Youtube site, the user can specify whether selection of the video will result in local display of the video in a local video player or whether the browser will be redirected to a native Youtube web page to display the video.

At 408, the selected item is processed as appropriate for the specific item and/or source site of the search result. According to a current embodiment, the selection of a search result can result in either local display of the fuller results at 410 or a transfer/redirection of the browser to the native web page for the search results at 412.

Figure 5:
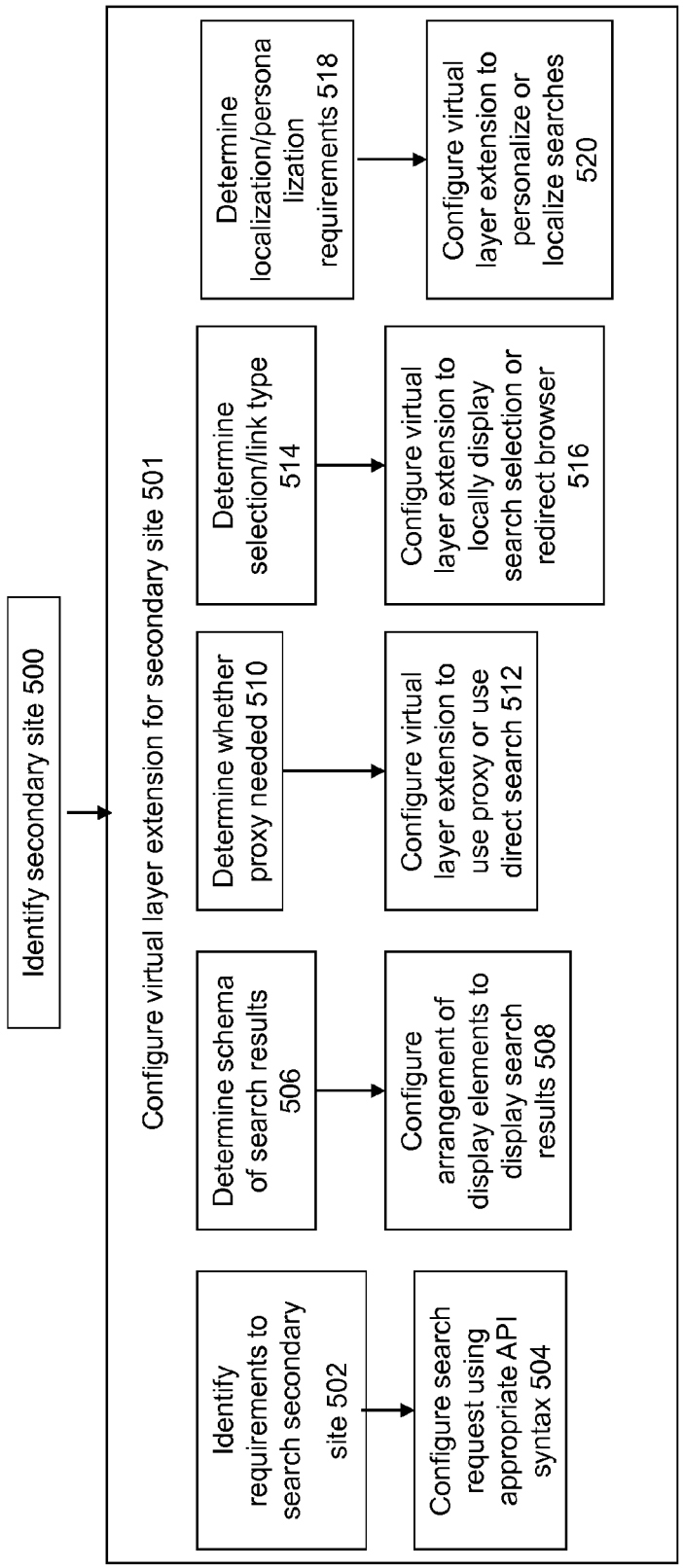
FIG. 5 illustrates a flowchart of an approach for configuring virtual layer software to perform search aggregation with virtual layers according to an embodiment of the invention.

FIG. 5 shows a flowchart of an approach to configure the virtual layer extension to perform aggregate searching according to some embodiments of the invention. Each potential web site that may be searched as a secondary search site is addressed as described in FIG. 5 according to the current embodiment. At 500, the web site for which searching may be performed as a secondary search site is identified.

The extension program needs to be configured to address how search requests are sent to the search site. For example, certain search sites may have their own API that requires a specific command syntax to perform the search. For these sites, at 502, the process identifies the specific API requirements for the search site. At 504, the extension program is configured to issue the search request using the specific API syntax required by that search site.

In addition, the raw data for search results from the different search sites may be returned using a format that is specific to that web site. At 506, a determination is made of the specific format of the raw data for the search result to be returned by that search site. In many cases, the search results will be returned as XML or JSON (Java Script Object Notation) having a specific schema. Therefore, at 508, the raw data for the search results would be arranged as appropriate to suitably display the search results. In some situations, it may be appropriate to arrange the search results to be displayed in a manner that mimics the display characteristics of the source search site. In the situations, the search results may be displayed differently from the format of the source search site.

In some situations, the search request cannot be made directly to the secondary search site. For example, assume that the virtual layer extension is embodiment as a Flash program. Certain web sites prohibit search request that are made from a Flash program (e.g., because the proper authorization settings at the web site have not been made to allow such access by Flash programs). In these situations, a proxy may need to be used to issue the search request. Therefore, at 510, a determination is made whether the identified search site requires a proxy approach for issuing the search request. If so, then at 512, the virtual layer extension is configured to use a proxy (e.g., non-Flash program at the layer definition server) to send the search request to the search site.

Selection of an item from the search results may need to be handled differently between items from different web sites. For example, certain items from the search results should be handled by local display while others may need redirection of the browser window to a native web page from the search site. Therefore, at 514, a determination is made of the selection/link type for the search result. This may be generally determined based on the source web site, e.g., selection of items for a certain web site should be configured to always redirect to a web page or should be configured to always provide a local display. Alternatively, the configuration is made by user preference. At 516, the virtual layer extension is configured to impose the handling approach for user selection.

Localization/personalization requirements may also be imposed for certain searches and/or web sites. Therefore, at 518, a determination is made whether such a requirement for personalization or location exists for the search site. For example, the service provide by the Yelp web site may be implemented to provide a search that is constrained by a given location. At 520, the virtual layer extension is configured to address any localization or personalization requirements. For example, the IP address of the user device can be recognized and used to identify the user location. Alternatively, the user can specify a given location to provide for the localization parameter.

FIGS. 6A-D illustrate an example system 600 and sequence of actions for system 600 that may be taken to perform search aggregation according to some embodiments of the invention. The system 600 comprises a user station system 604 at client 606 from which one or more users may operate the system 600 to perform search aggregation. The users at user station 604 correspond to any individual, organization, or other entity that uses system 604 for accessing the internet. User station comprises any type of computing station that may be used to operate, interface with, or implement searches on the internet. Examples of such user stations 604 include for example, workstations, personal computers, or remote computing terminals. User station 604 comprises a display device, such as a display monitor, for displaying a web page using a web browser 602. User station 604 also comprises one or more input devices for the user to provide operational control over the activities of system 600, such as a mouse or keyboard to manipulate a pointing object in a graphical user interface.

The user station 604 may be associated with one or more computer readable mediums or storage devices that hold data regarding the user's internet activities or searching. The computer readable storage device at user station 604 comprises any combination of hardware and software that allows for ready access to the data that is located at the computer readable storage device. For example, the computer readable storage device could be implemented as computer memory operatively managed by an operating system. The computer readable storage device could also be implemented as persistent and/or non-persistent storage.

The system 600 includes a server 622 corresponding to a first search site A and a server 624 corresponding to a second search site B. The system 600 also includes a layer definition server 620 from which virtual layer software may be obtained.

Figure 6A:
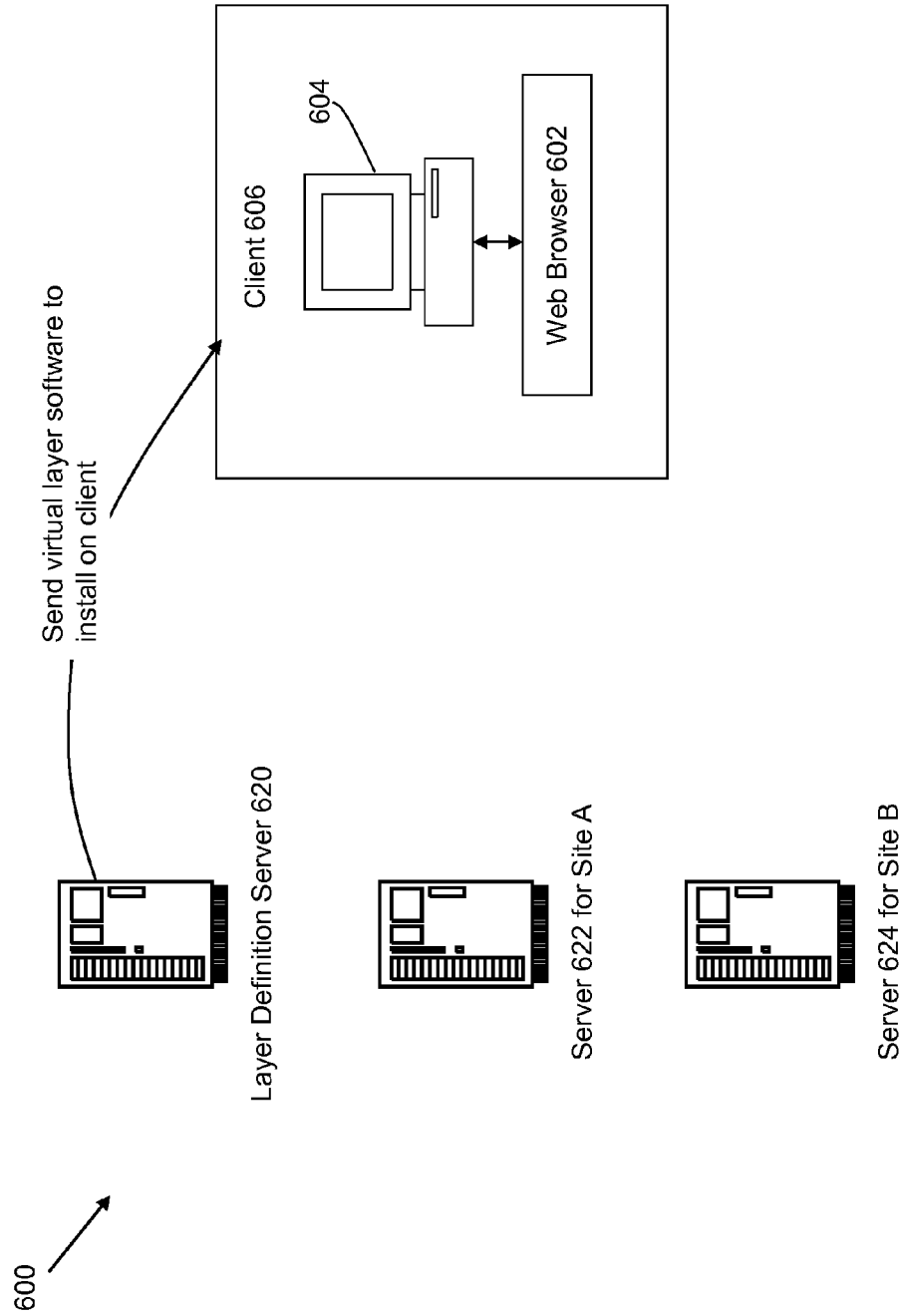

FIG. 6A shows the virtual layer software being installed onto the user station 604. As previously noted, the virtual layer software may be implemented as a virtual layer plug-in 610 (shown in FIG. 6B) to enable virtual editing of the appearance or functionality of an existing web page by making the modifications on a virtual layer that is superimposed onto the web page. The virtual layer essentially allows a foreign entity or a user to include or enhance content that is utilized or displayed onto a web page, even if the web page itself does not natively provide such functionality to allow a third party to add or enhance content on the web page.

Figure 6B:
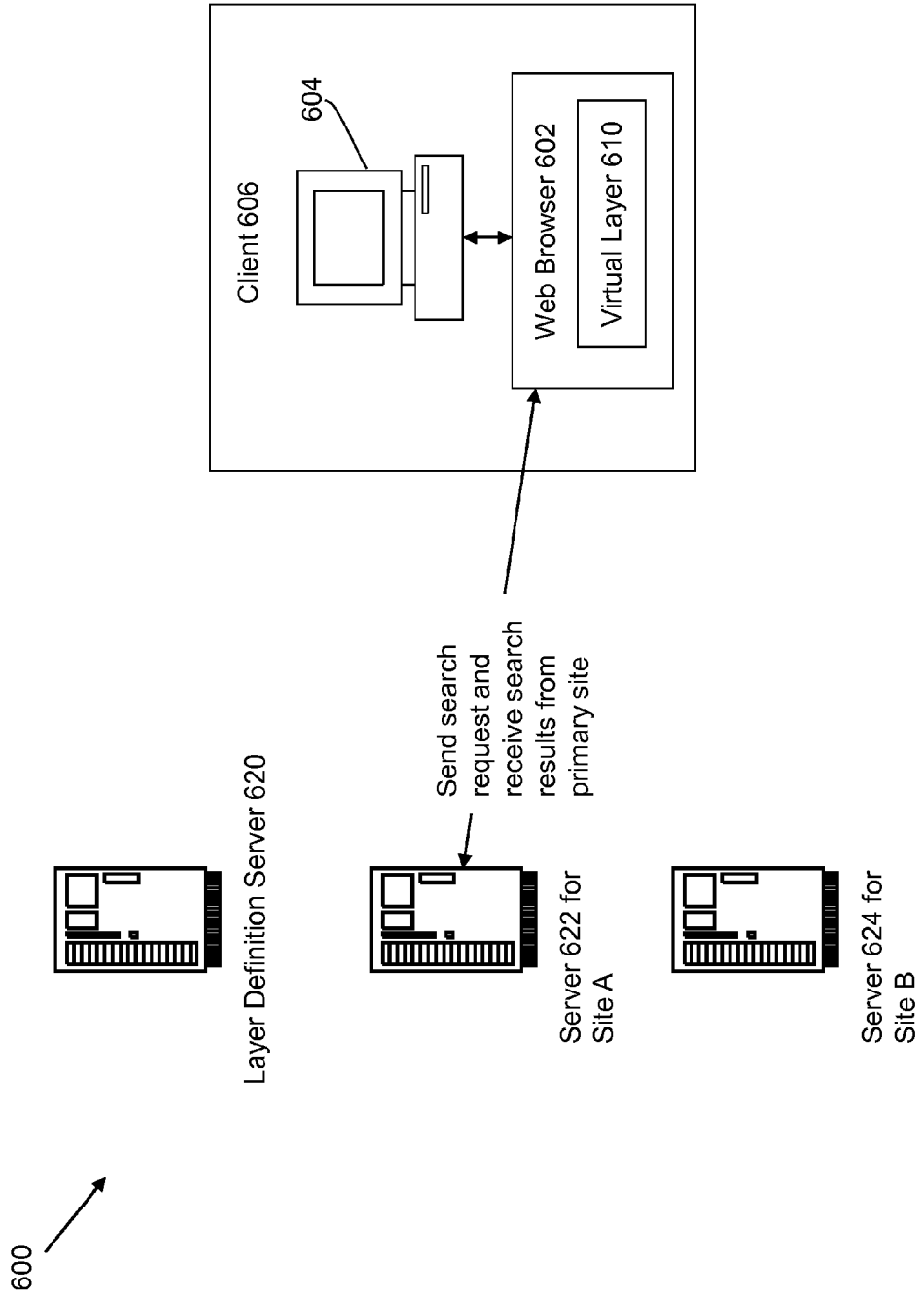

Assume that the user at user station 604 opens a web page at web browser 602 from the server 622 for primary search site A. FIG. 6B illustrates that the web browser 602 will directly send a search request to the server 622 for Site A, and that the search results will be returned to user station 604 to be displayed within a web page in web browser 602 for that Site A.

Further assume that it is desired to perform search aggregation to obtain additional searching results from server 624 for secondary search site B. The URL of the search result page from server 622 for Site A can be analyzed to obtain the search key for the search. FIG. 6C shows the situation in which a direct search request can be made from the virtual layer software 610 at user station 604 to the server 624. As shown in FIG. 6C, the virtual layer software will directly send a search request to perform a search of the secondary search site B for the search term extracted from the URL. The server 624 will perform the requested search, and will provide search results back to the virtual layer software 610.

The virtual layer software 610 will then place search results onto a virtual layer that is overlaid onto the web page from server 622, so that the secondary search results from server 624 can be displayed within (and aggregated with) the primary search results from server 622. While this example only shows searching against just one secondary search site B, it is evident that the invention can be applied to perform this type of searching against any number secondary search sites.

Figure 6D:
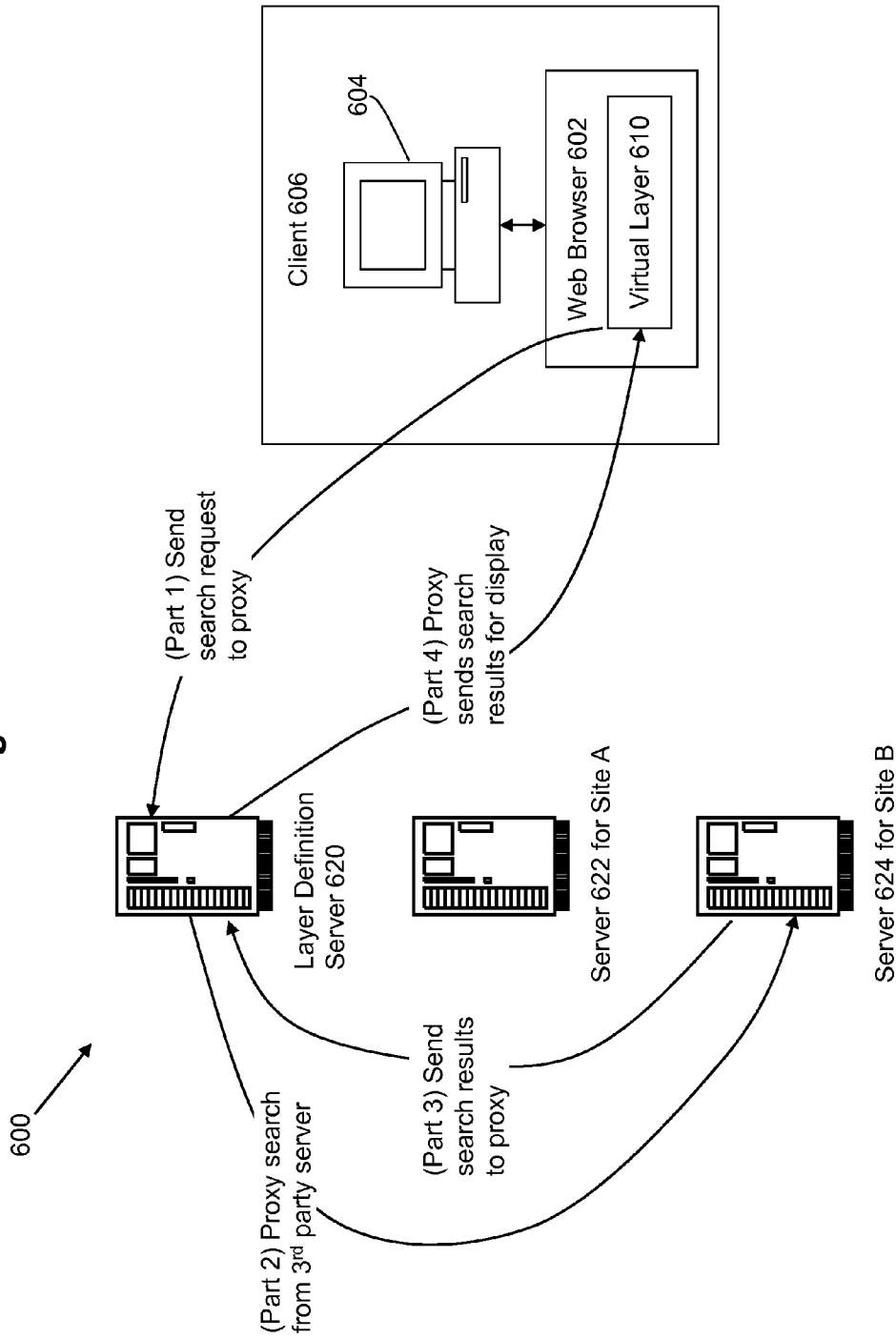

FIG. 6D shows the situation when a direct search request cannot be made from the virtual layer software 610 at user station 604 to the secondary search server 624. In this situation, the virtual layer software 610 will direct the search request to a proxy device, such a non-Flash software at the layer definition server 620. The proxy device will issue the desired search to the server 624 to perform a search of the secondary search site B. The server 624 will perform the requested search, and will provide search results back to the proxy at server 620. The server 620 will then forward the search results to the virtual layer software 610. As previously described, the virtual layer software 610 will then place search results onto a virtual layer that is overlaid onto the web page from server 622, so that the secondary search results from server 624 can be displayed within (and aggregated with) the primary search results from server 622.

Therefore, what has been described is an improved approach for perform search aggregations for searching web sites. By using the virtual layer approach of embodiments of the present invention, this allows the aggregated search results to be placed on and overlaid with the web page from any desired search page. In addition, the searching can be specified for any secondary search sites, even sites which are not particularly with the same subject space as the primary site.

System Architecture Overview

Figure 7:
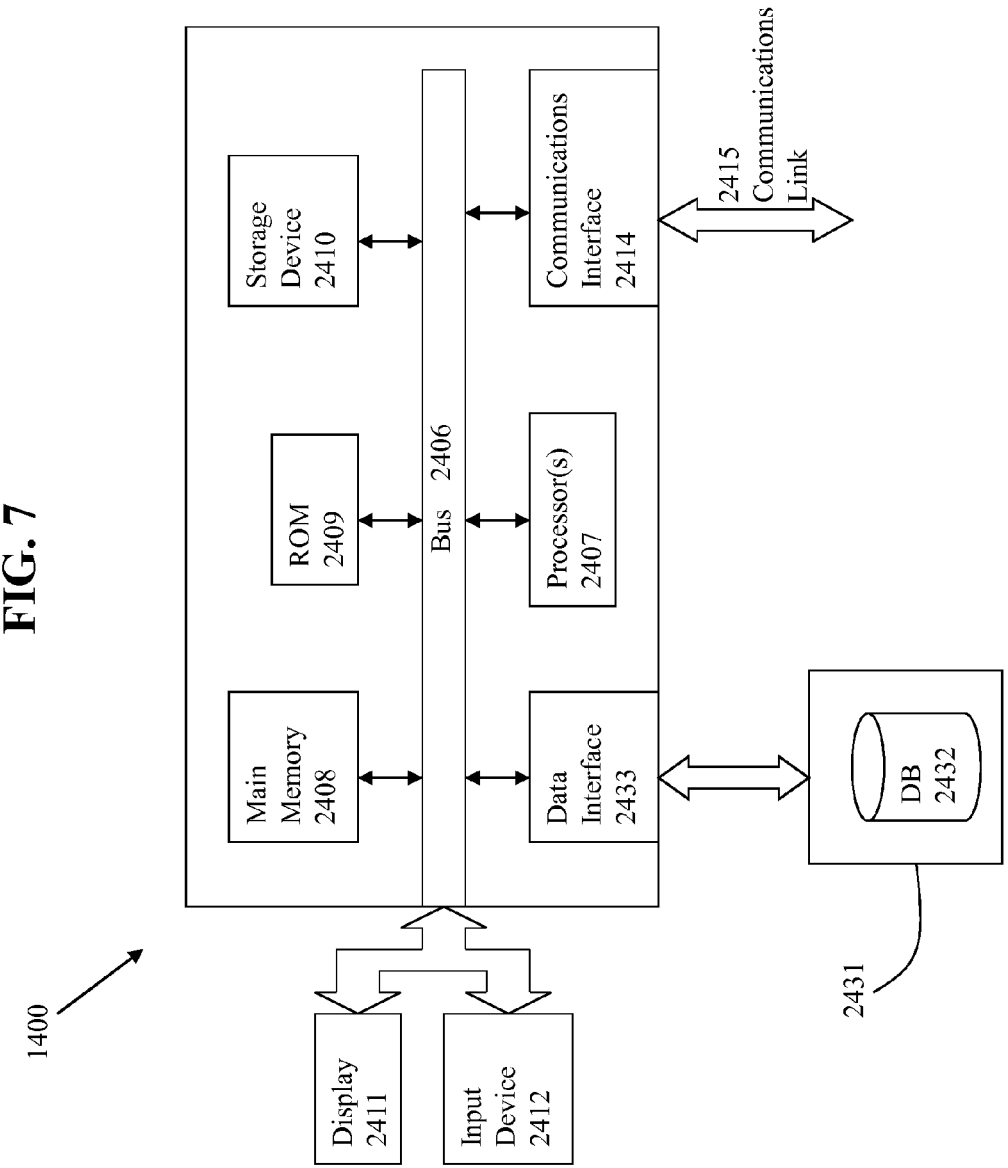
FIG. 7 depicts a computerized system on which the invention can be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for implementing aggregation of search results, comprising:

using a processor at a client system to implement a virtual layer on a host web page, wherein the host web page includes a first set of search results from performing a search using one or more search terms at a primary search site associated with the host web page, and wherein the virtual layer is not implemented natively by a server associated with the host web page;

sending the one or more search terms used to perform the search at the primary search site to one or more secondary search sites;

generating additional search results, in which the additional search results are from performing one or more searches at the one or more secondary search sites using the one or more search terms used to perform the search at the primary search site; and displaying the host web page at the client system, wherein the additional search results are superimposed onto the host web page using the virtual layer implemented at the client system, and in which the additional search results are presented in a format that mimics native presentation characteristics of the one or more secondary search sites.

2. The method of claim 1 in which the additional search results result from using a search key extracted from a URL of the host web page or extracted from content of the primary search site.

3. The method of claim 1 in which the one or more secondary search sites correspond to different subject areas from the primary search site.

4. The method of claim 1 in which a search request is sent to the one or more secondary search sites using an API associated with the one or more secondary search sites.

5. The method of claim 1 in which the additional search results from the one or more secondary search sites are formatted before being displayed and superimposed onto the host web page.

6. The method of claim 1 in which the additional search results from the one or more secondary search sites are displayed in a shorthand format.

7. The method of claim 6 in which the shorthand format comprises a thumbnail image.

8. The method of claim 7 in which selection of the thumbnail image causes an expansion of the shorthand format.

9. The method of claim 1 in which selection of an item from the additional search results causes navigation to a corresponding one of the one or more secondary search sites.

10. The method of claim 1 in which selection of an item from the additional search results causes local display of an expanded view of the selected item.

11. The method of claim 1 in which localization is performed to generate the additional search results, where an IP address is used to identify a location or a user specifies the location.

12. The method of claim 1 in which personalization is performed to generate the additional search results, where the personalization focused the additional search results relative to a given user.

13. The method of claim 1 in which a proxy is employed to send a search request to the one or more secondary search sites.

14. The method of claim 1 in which the one or more secondary sites are different from the primary search site.

15. The method of claim 1 in which the primary search site and the one or more secondary search sites comprise at least one of a web site, RSS feed, tweet, blog, or text message.

16. A system for implementing aggregation of search results, comprising:

a processor at a client system; and a memory to execute computer code using the processor, in which the computer code implements, at the client system, a virtual layer on a host web page that includes a first set of search results from performing a search using one or more search terms at a primary search site associated with the host web page, wherein the virtual layer is not implemented natively by a server associated with the host web page, sends the one or more search terms used to perform the search at the primary search site to one or more secondary search sites, generates additional search results, in which the additional search results are from performing one or more searches at the one or more secondary search sites using the one or more search terms used to perform the search at the primary search site, and displaying the host web page at the client system, wherein the additional search results are superimposed onto the host web page using the virtual layer implemented at the client system, and in which the additional search results are presented in a format that mimics native presentation characteristics of the one or more secondary search sites.

17. The system of claim 16 in which the additional search results result from using a search key extracted from a URL of the host web page or extracted from content of the primary search site.

18. The system of claim 16 in which the one or more secondary search sites correspond to different subject areas from the primary search site.

19. The system of claim 16 in which a search request is sent to the one or more secondary search sites using an API associated with the one or more secondary search sites.

20. The system of claim 16 in which the additional search results from the one or more secondary search sites are formatted before being displayed and superimposed onto the host web page.

21. The system of claim 16 in which the additional search results from the one or more secondary search sites are displayed in a shorthand format.

22. The system of claim 21 in which the shorthand format comprises a thumbnail image.

23. The system of claim 22 in which selection of the thumbnail image causes an expansion of the shorthand format.

24. The system of claim 16 in which selection of an item from the additional search results causes navigation to a corresponding one of the one or more secondary search sites.

25. The system of claim 16 in which selection of an item from the additional search results causes local display of an expanded view of the selected item.

26. The system of claim 16 in which localization is performed to generate the additional search results, where an IP address is used to identify a location or a user specifies the location.

27. The system of claim 16 in which personalization is performed to generate the additional search results, where the personalization focused the additional search results relative to a given user.

28. The system of claim 16 in which a proxy is employed to send a search request to the one or more secondary search sites.

29. The system of claim 16 in which the one or more secondary sites are different from the primary search site.

30. The system of claim 16 in which the primary search site and the one or more secondary search sites comprise at least one of a web site, RSS feed, tweet, blog, or text message.

31. A computer program product embodied on a non-transitory computer usable medium, the computer readable medium having stored thereon a sequence of instructions which, when executed by a processor causes the processor to execute a method for implementing aggregation of search results, the method comprising:

using a processor at a client system to implement a virtual layer on a host web page, wherein the host web page includes a first set of search results from performing a search using one or more search terms at a primary search site associated with the host web page, and wherein the virtual layer is not implemented natively by a server associated with the host web page;

sending the one or more search terms used to perform the search at the primary search site to one or more secondary search sites;

generating additional search results, in which the additional search results are from performing one or more searches at the one or more secondary search sites using the one or more search terms used to perform the search at the primary search site; and displaying the host web page at the client system, wherein the additional search results are superimposed onto the host web page using the virtual layer implemented at the client system, and in which the additional search results are presented in a format that mimics native presentation characteristics of the one or more secondary search sites.

32. The computer program product of claim 31 in which the additional search results result from using a search key extracted from a URL of the host web page or extracted from context analysis of the primary search site.

33. The computer program product of claim 31 in which the one or more secondary search sites correspond to different subject areas from the primary search site.

34. The computer program product of claim 31 in which a search request is sent to the one or more secondary search sites using an API associated with the one or more secondary search sites.

35. The computer program product of claim 31 in which the additional search results from the one or more secondary search sites are formatted before being displayed and superimposed onto the host web page.

36. The computer program product of claim 31 in which the additional search results from the one or more secondary search sites are displayed in a shorthand format.

37. The computer program product of claim 36 in which the shorthand format comprises a thumbnail image.

38. The computer program product of claim 37 in which selection of the thumbnail image causes an expansion of the shorthand format.

39. The computer program product of claim 31 in which selection of an item from the additional search results causes navigation to a corresponding one of the one or more secondary search sites.

40. The computer program product of claim 31 in which selection of an item from the additional search results causes local display of an expanded view of the selected item.

41. The computer program product of claim 31 in which localization is performed to generate the additional search results, where an IP address is used to identify a location or a user specifies the location.

42. The computer program product of claim 31 in which personalization is performed to generate the additional search results, where the personalization focused the additional search results relative to a given user.

43. The computer program product of claim 31 in which a proxy is employed to send a search request to the one or more secondary search sites.

44. The computer program product of claim 31 in which the one or more secondary sites are different from the primary search site.

45. The computer program product of claim 31 in which the primary search site and the one or more secondary search sites comprise at least one of a web site, RSS feed, tweet, blog, or text message.

* * * * *